Oct. 22, 1935.      H. A. BARNBY      2,018,005
SEALING MEANS FOR EMPTY CONTAINERS
Filed Nov. 17, 1933
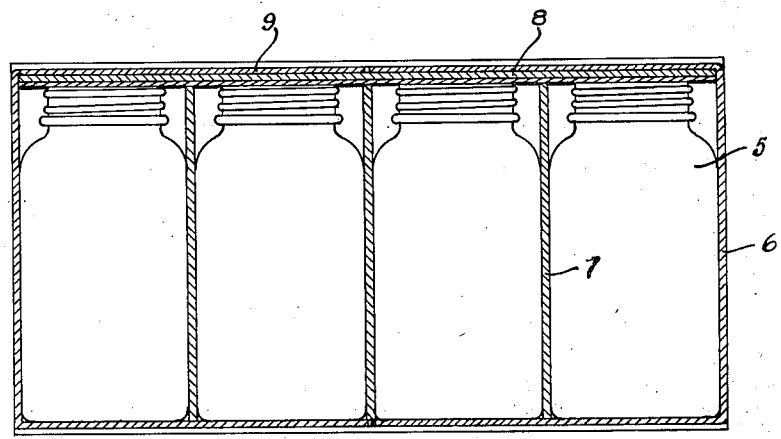
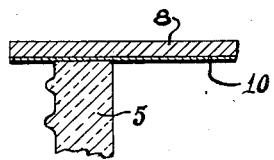
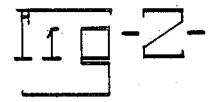
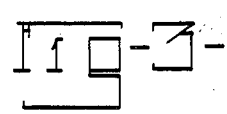
Inventor
Herbert A. Barnby
By J. F. Rule,
Attorney Patented Oct. 22, 1935

2,018,005

UNITED STATES PATENT OFFICE 2,018,005

SEALING MEANS FOR EMPTY CONTAINERS

Herbert A. Barnby, Toledo, Ohio, assignor to Owens-Illinois Glass Company, a corporation of Ohio Application November 17, 1933, Serial No. 698,473

4 Claims. (Cl. 206—46)

My invention relates to a method and apparatus for closing and sealing empty bottles, jars or other containers and thereby protecting the interiors thereof from dust, dirt, dampness and other contaminating or deteriorating influences. The invention is of value for use in connection with glassware such as bottles and jars, although not limited to such use.

In the manufacture of glass containers, such as bottles and jars, it is customary to pack them in cartons either for shipping or storing, as the articles are taken from the annealing leer. These are often stored in large warehouses for long periods of time. At the time they are packed for storing they are dry, clean and sterile. But during handling in cartons or cases, carton dust and other dirt or foreign material frequently gets inside the containers, making it necessary to wash them after they are received by the customer. Further, as the storage houses are usually quite open and exposed to the weather, breathing of damp air into the cartons and the containers therein, takes place during temperature changes in damp weather. The moisture thus introduced causes "weathering" of the interior surfaces of the containers. The interior surfaces of glass bottles, jars and the like are much more subject to weathering or action of the elements than the exterior surfaces thereof. This is due to the method of making such articles. When the molten glass is blown to shape in the mold, the contact of the comparatively cold iron mold with the hot glass produces a surface chill and hardening of the glass, thus providing a protective film or layer of enamel on the exterior surface of the article which protects it from weathering. The interior surface of the blown article is not case hardened in this manner and is much more susceptible to the action of moisture, carbon dioxide and other destructive agents.

An object of my invention is to provide a simple, practical and effective method and means by which the empty containers are sealed with a moisture-proof material at the time they are packed, thereby keeping them clean and sterile and fully protecting their interior surfaces against weathering conditions while they are in storage.

Other objects of the invention will appear hereinafter.

In the accompanying drawing:

Fig. 1 is a sectional elevation of a carton packed with empty jars, the latter being sealed in accordance with the present invention.

Fig. 2 is a perspective view of a cover pad with a layer or sheet of the sealing material applied thereto.

Fig. 3 is a detail perspective view showing the lip of a jar and the sealing means applied thereto.

The glass jars 5 may be packed in the usual manner in a case or carton 6. The capacity of the cartons usually ranges from a dozen jars upward, a gross or more of small bottles being sometimes packed in a carton. The carton is made of corrugated paper or other suitable material. Spacing strips 7 may be provided, as usual, for separating the jars, protecting them and holding them compactly in position. After the jars are placed in the carton, a top pad 8 may be placed in position within the carton over the open mouths of the jars, after which the cover flaps 9 are turned down and closed in the usual manner.

In accordance with the present invention, there is interposed between the pad 8 and the jars, a sheet or layer of sealing material 10 which makes sealing contact with the upper surfaces or lips of the jars, thereby sealing them and protecting them against dust, dirt, moisture, fumes, gases and other contaminating or destructive elements. The sealing element 10 may comprise a thin sheet of suitable material separate from the pad 8, or it may consist of a sheet or layer of sealing material attached or applied to one surface of the pad 8 as a part thereof. When the sealing element, either as a separate sheet or as a surface layer on the pad 8, has been placed in position on the containers 5, top pressure is applied sufficient to make a good seal and cause the sealing material to adhere to the containers. The pressure may be applied by a roller or in any other approved manner.

I have found that various materials are adapted for use as the sealing material 10. Gums, resins and other moisture-proof materials may be used. For example, a thin sheet of rubber composition having a rather tacky surface is well adapted for the purpose. Such a sheet of material under moderate pressure will make good sealing contact with the lips of the jars and will be held thereby securely in position against accidental displacement, but can readily be removed. The entire sheet can be stripped off when it is desired to use or fill the jars and will not leave any objectionable substance adhering to the lips of the jars.

Modifications may be resorted to within the spirit and scope of my invention.

I claim:

1. The combination of a carton, spacing strips therein providing cells to receive empty containers packed in the carton and open at their upper ends, a cover pad having approximately the lateral dimensions of the carton and extending into position to cover said open ends of the containers packed in the carton, and means applied to the pad providing a layer of sealing material interposed between said pad and the open ends of the containers, said sealing material providing an adhesive surface which will adhere to the mouths of the containers.

2. The combination of a carton, spacing strips therein providing cells to receive empty containers packed in the carton, a cover pad having approximately the lateral dimensions of the carton and extending into position to cover the mouths of the articles packed in the carton, and means applied to the pad providing a layer of sealing material interposed between said pad and the mouths of said containers, said sealing material being moisture-proof and presenting a tacky surface which will adhere to the mouths of the containers, thereby sealing the containers.

3. A package comprising a carton, hollow empty glass articles packed in said carton with their mouths in substantially the same plane, and a sheet or layer of sealing material separate from the carton overlying said mouths and in sealing contact therewith, said sheet having an adhesive surface which will adhere to the mouths of the articles.

4. The combination of a carton, a cover member adapted to overlie the mouths of empty containers within the carton, and a sealing material applied to the cover and providing an adhesive surface on the lower side of the cover member which will adhere to the mouths of said container.

HERBERT A. BARNBY.